United States Patent Office 3,024,286
Patented Mar. 6, 1962

3,024,286
PROCESS OF PREPARING 3,5-DIMETHYL-PHENYL METHYL CARBINOL
Frank A. Cassis, Munster, Ind., assignor to Standard Oil Company, Chicago, Ill., a corporation of Indiana
No Drawing. Filed Oct. 2, 1958, Ser. No. 764,753
3 Claims. (Cl. 260—618)

This invention relates to a process for the purification of aromatic hydrocarbons prepared by treatment of methylbenzenes with an ethylating agent in the presence of liquid hydrogen fluoride and boron trifluoride. It particularly concerns the preparation of a purified ethylbenzene having at least one nuclear methyl substituent suitable for conversion by catalytic liquid phase oxidation with molecular oxygen-containing gas to a methyl-substituted phenyl methyl carbinol.

The commercial polystyrene resins have the disability of a softening point lower than the boiling point of water. It is known that resins prepared from methyl-styrenes have a softening point higher than the boiling point of water. Such methylstyrenes are therefore desirable articles of commerce suitable for polymerization to useful polystyrene plastics. Among the various methyl-styrenes, meta-vinyltoluene and 3,5-dimethylstyrene especially are commercially attractive products which can be suitably prepared from aromatic hydrocarbons now readily available from hydrogen fluoride-boron trifluoride conversion processes.

The art is well aware of two important processes for the preparation of styrene from ethylbenzene and either of these known processes can be employed for the conversion of ethylbenzenes having nuclear methyl substituents to methylstyrenes. In the more widely employed commercial process for the preparation of styrene (vinylbenzene), ethylbenzene is catalytically dehydrogenated at elevated temperature to a mixture of styrene and ethylbenzene from which the styrene can be subsequently separated by fractional distillation under vacuum. Such process, while inherently applicable to the preparation of methylstyrenes, for example from 1,3,5-dimethylxylene, is difficult to effect on a commercial scale because (a) of the higher boiling point of the substituted styrene and substituted ethylbenzene which requires higher distillation temperatures even under vacuum, resulting in polymerization of the monomer during distillation and (b) of the close boiling points of methylstyrenes and the corresponding methyl-substituted ethylbenzenes which makes the separation by fractional distillation even more difficult than in the case of styrene and ethylbenzene.

In order to successfully prepare methylstyrenes, resort was therefore had to the second known commercial process for the conversion of ethylbenzene to styrene, namely the partial oxidation of ethylebenzene to methyl-phenyl carbinol followed by dehydration of the carbinol to styrene. In applying this process to the preparation of methylstyrenes from feedstocks obtained from HF—$BF_3$ conversion processes, it was unexpectedly discovered that the feedstocks employed were not amenable to oxidation in the liquid phase with air in the presence of metallic oxidation catalysts. It was found that such feedstocks were contaminated with sulfur compounds which effectively inhibited the oxidation process. It was further discovered that these sulfur-containing inhibitors were present in such feedstocks despite the fact that the latter were prepared from relatively sulfur-free hydrocarbons via the hydrogen fluoride-boron trifluoride conversion process. It became clear then that such sulfur-containing inhibitors were introduced to the hydrocarbon feedstock during the course of preparation of the desired feedstock by reaction in an HF—$BF_3$ medium and that effective utilization of hydrocarbons derived from such conversion processes required pretreatment to be commercially useful in oxidation processes.

The preparation of ethylbenzenes having at least one nuclear methyl substituent by treatment of toluene or polymethylbenzenes with an ethylating agent in the presence of hydrogen fluoride-boron trifluoride is well known, and has been described in U.S. Patents 2,661,382; 2,725,-413 and 2,766,307 of A. P. Lien and D. A. McCauley. The teachings of these patents are incorporated herein by reference. In accordance with the teachings of these patents, ethylbenzenes having nuclear methyl groups can be prepared by the reaction of methylbenzenes with ethylating agents such as ethylene or ethylbenzene under controlled conditions in the presence of liquid HF and $BF_3$. Desirably ethylation, for example of xylene, is effected in the presence of about 0.7 to about 1.5 moles $BF_3$ per mole of xylene. Preferably sufficient boron trifluoride is employed to form a complex containing one mole of boron trifluoride per mole of xylene and also probably 1 mole of HF per mole of xylene. Sufficient HF is required to be present to dissolve all of the complex so formed and preferably an excess over this amount of liquid HF is desirable.

I have found that the use of such liquid HF—$BF_3$ reaction systems characteristically introduces a sulfur-containing impurity into the hydrocarbon produced by processes employing such systems and this in spite of the fact that the feedstocks employed in the HF—$BF_3$ conversion process are substantially free of sulfur-containing impurities. While I do not wish to be bound by any theory as to the origin of such sulfur-containing impurities, it appears that the success of the HF—$BF_3$ conversion process depends upon the high ratios of HF and $BF_3$ to hydrocarbon employed in the system. Minor impurities inherently present in the HF and $BF_3$ are therefore introduced in major amount to the conversion process effluent.

Typically, boron trifluoride is commercially prepared by the reaction of borax with aqueous hydrofluoric acid or by the reaction of boric acid with ammonium trifluoride. In either case the resulting salt, for example $Na_2O(BF_3)_4$ or $(NH_4)_2O \cdot (BF_3)_4$ is dried and then treated with fuming sulfuric acid to evolve the desired boron trifluoride as a gas. While this gas is substantially pure boron trifluoride, the commercial product characteristically contains minor amounts of sulfur and analysis of the commercial product indicates the following usual composition:

ANALYSIS OF BORON TRIFLUORIDE [1] (PERCENT BY WEIGHT)

| | |
|---|---|
| $BF_3$ | 99.0–99.5 |
| $SiF_4$ | 0.2–0.5 |
| $SO_2$ | 0.2–0.4 |
| Air | ca. 0.1 |

[1] See for example, Analytical Chemistry, vol. 19, p. 28 (1947).

Similar considerations apply to the hydrogen fluoride of commerce, which, while usually of over 99.0% purity, invariably contains sulfur impurities in amounts of up to about 0.1–0.2% calculated as $SO_2$ (see for example, typical analysis of commercial samples in Ind. & Eng. Chem., Analytical Edition, vol. 16, p. 421 (1944)).

I believe that the minor amounts of sulfur impurities present in the hydrogen fluoride and boron trifluoride react with the hydrocarbons employed in the boron trifluoride hydrogen fluoride conversion process to give sulfur-containing impurities which act as oxidation inhibitors and prevent the liquid phase catalytic oxidation of such HF—$BF_3$ derived hydrocarbon feedstocks. I have found that these sulfur-containing impurities cannot be separated by ordinary fractional distillation but must be removed by a desulfurization process prior to oxidation of the methyl-substituted ethylbenzenes to the corresponding methylphenyl methyl carbinol.

Additionally, the system HF—$BF_3$ is known to be a potent solvent for the removal of sulfur-containing compounds from hydrocarbons containing as minor amounts of sulfur impurities. Such sulfur containing impurities readily form a complex with HF—$BF_3$ which complex is decomposed upon treatment of the HF—$BF_3$ reaction product, as by distillation or water washings. Thus even traces of sulfur-containing impurities in the feedstock to an HF—$BF_3$ conversion process will be concentrated in the hydrocarbon product, requiring desulfurization thereof prior to oxidation.

The desulfurization of methyl substituted ethylbenzenes derived from HF—$BF_3$ conversion processes can be accomplished by methods known in the art. For example such feedstocks containing up to 1/10 percent sulfur can be treated with metals known to react with sulfur-containing hydrocarbons including zinc, copper, iron, lead, manganese, and the like or their compounds. Raney nickel hydrogenation catalyst is especially effective and can be employed at temperatures of 50 to 150° C. for removal of these deleterious sulfur impurities. The desulfurization step in this process can be accomplished by treatment with excess finely dispersed metallic sodium, for example a sodium dispersion in which the sodium is of 1 to 15 micron size, at temperatures up from about 100° C. to about 300° C. Other methods of desulfurization that can be used include treatment of the aromatic with hydrogen and catalysts at elevated temperatures, passage of aromatic compound over a silica-alumina cracking catalyst and the like. Reference is here made to the work by V. A. Kalichevsky and B. Z. Stagner, entitled "Chemical Refining of Petroleum," (1942, Reinhold Publishing Corporation), especially chapter 5 for more detail on methods of accomplishing the desulfurization step of my process.

The methyl-substituted ethylbenzene from which sulfur-containing impurities have been removed are oxidized by treatment in the liquid phase with gaseous oxygen in the presence of a metallic oxidation catalyst. The oxidation is effected at temperatures of from 100 to 200° C. preferably from 125 to 160° C. Atmospheric pressure is effective, but elevated pressure, for example up to 100 p.s.i.g. can be employed. As the oxidizing gas, air is preferred because of economical considerations but pure oxygen, oxygen-containing mixtures such as air enriched with oxygen, or the like can be used. The metal oxidation catalyst is employed in an amount of 0.1 to about 2% by weight based on the aromatic compound being oxidized and is preferably selected from those metal compounds well known in the art as oxidation catalysts. Heavy metals especially those metals having an atomic number from 50 to 60 can be advantageously employed as catalysts. Manganese, cobalt or mixtures thereof are preferred. The catalysts are preferably employed as salts of carboxylic acids including the lower carboxylic acid salts such as the acetates, salts of fatty acids such as the oleates or linoleates, as naphthenates or as salts of aromatic carboxylic acids, for example benzoates and the like. Exemplary metal oxidation catalysts include cobalt acetate, cobalt naphthenate, manganese naphthenate, manganese acetate, manganese oleate, and the like. The temperature and pressure must be so regulated in the oxidation as to prevent over-oxidation of the feedstock to substituted benzoic acids, the desired product being the methylphenyl methyl carbinol. Partial oxidation to the carbinol is invariably accompanied by conversion of a portion of the product to the methylphenyl methyl ketone which is readily hydrogenated to the desired carbinol. Over-oxidation is to be avoided, however, so as to prevent conversion of the ketone to substituted benzoic acids which are wasteful of starting material.

In order to facilitate a clear understanding of the invention, the following specific embodiments are provided wherein the preparation, purification and oxidation of 1,3,5-ethylxylene is described in detail. It is to be understood, however, that the invention is not limited to this feedstock alone, but is equally applicable to other hydrocarbon feedstocks obtained from HF—$BF_3$ conversion processes, as for example ethyltoluene, trimethylethylbenzene and the like.

The meta-xylene employed in the preparation of 1,3,5-ethylxylene was analyzed for sulfur and found to contain less than 5 p.p.m. sulfur (Method: ASTM Lamp Sulfur D1266–577).

PREPARATION OF 1,3,5-ETHYLXYLENE 3.02 moles of m-xylene were added to a 1570 ml. carbon steel autoclave fitted with a 1725 r.p.m. stirrer; this was followed by 23 moles of liquid HF (150 volume percent on xylene). $BF_3$ was pressured into the reactor from a small cylinder. A total of 4.5 moles of $BF_3$ were added, which amounted to a $BF_3$/xylene ratio of 1.5. At the reaction temperature of +20° C., the pressure in the reactor was 140 p.s.i.a.

Ethylene gas was added to the contents of the reactor over a period of 5 minutes; 1.21 moles were added for a xylene/ethylene ratio of 2.50. The pressure on the reactor indicated the ethylene was rapidly absorbed. The reactor contents were maintained at 20° C. for 15 minutes. The contents were withdrawn into a Dry-Ice cooled flask containing about 70 ml. of water. Insofar as could be determined by visual observation, only one single phase homogeneous system had existed in the reactor.

The flask was allowed to warm to room temperature. The contents were transferred to a separating funnel, where the supernatant hydrocarbons—displaced from their complexes by the water—were separated from the aqueous acid phase. The hydrocarbons were washed with dilute aqueous ammonium hydroxide to remove traces of HF and $BF_3$. The hydrocarbons were fractionated through a column of 30 theoretical plates. The distillation separated the product into groups according to number of carbon atoms; the composition of each group was determined by a combination of ultra-violet absorption, infrared absorption, refractive index, boiling point and specific gravity.

The total product distribution in this run was as follows:

| Hydrocarbons | Moles | Percent |
|---|---|---|
| m-Xylene | 2.06 | |
| 1,3,5-ethylxylene | .65 | 67.8 |
| 1,3,4-ethylxylene | .02 | 2.0 |
| 1,3,2-ethylxylene | .02 | 2.0 |
| $C_{12}$ aromatics | .27 | 28.2 |
| | | 100.0 |

The properties of the total ethylxylene product in Run 5 and the properties of 1,3,5-ethylxylene as given by Birch et al., JACS, 71, 1362 (April 1949), are:

| | Run 5 | Birch et al. |
|---|---|---|
| B.P., °C | 184 | 183.65 |
| $N_D^{20}$ | 1.4980 | 1.4981 |
| Sp. Gr | 0.865 | 0.8644 |

Similarly, 1,3,5-ethylxylene can be prepared by the reaction of meta-xylene and ethylbenzene in accordance with the teachings of U.S. 2,766,307. Ethyltoluene is readily prepared by the method of U.S. 2,725,413 similarly employing an HF—$BF_3$ conversion process.

A portion of the 1,3,5-ethylxylene obtained as described above was analyzed and found to contain 0.06% sulfur (as a disulfide impurity) that could not be removed by further fractionation. 135 cc. of this material was subjected to air oxidation using air at atmospheric pressure in the presence of 0.1% by weight manganese acetate catalyst. The temperature of oxidation was 135–145° C. and the air rate employed was 1.2 liters per minute. After 6 hours the oxidation mixture was distilled and 97% of the ethylxylene recovered unchanged. A small amount of black tar was obtained as the distillation residue.

*Example 1*

A second portion of the ethylxylene obtained as described hereinbefore containing 0.06% sulfur was treated with 2 grams of Raney nickel hydrogenation catalyst at 75° C. for one hour. The mixture was filtered and the ethylxylene filtrate (containing less than 10 p.p.m. sulfur) subjected to oxidation following the procedure as described hereinbefore. After 6 hours, the product was washed with sodium hydroxide and water, dried and fractionated under reduced pressure. A 45% conversion of ethylxylene to oxygenated products was achieved, approximately 50% of the original ethylxylene being recovered unchanged. From the oxygenated products, a 95% yield of the dimethylphenyl methyl carbinol and the corresponding 3,5-dimethyl acetophenone was obtained. Acidification of the caustic wash yielded less than 2% of 3,5-dimethylbenzoic acid as the other oxidation product.

*Example 2*

1,3,5-dimethylxylene prepared by as hereinbefore described was passed over a copper chromite catalyst comprising 20% copper–80% chromia (Harshaw Chemical Company) at 600–650° C. in the presence of 10 moles of steam per mole of aromatic hydrocarbon and at a space velocity of about 1.5. The hydrocarbon layer in the effluent was dried over calcium carbonate and distilled. Ethylxylene was obtained having a boiling point of 49° C. at 5 mm. Hg, and containing no detectable sulfur. This ethylxylene was subjected to catalytic air oxidation in accordance with the procedure as described hereinbefore. A 50% conversion to oxygenated products was achieved, approximately 95% of the oxygenated material being a mixture of dimethylphenyl methyl carbinol and 3,5-dimethyl acetophenone.

*Example 3*

Similarly, 1,3,5-ethylxylene containing 0.06% sulfur (as a disulfide impurity) is treated with 50–150% excess dispersed sodium (particle size 1–15 microns) in an autoclave equipped with an efficient stirrer. Treatment at 250° C. for 15 minutes reduces the sulfur content of the filtered hydrocarbon to less than 1 p.p.m. This sulfur-free hydrocarbon is readily oxidized to a mixture of 3,5-dimethylphenyl methyl carbinol and 3,5-dimethyl acetophenone.

It will be clear from the above examples that removal of sulfur impurities from hydrocarbons produced via H—BF₃ conversion processes is an essential step in the conversion of such hydrocarbons to useful oxidation products. I have found that as little as 100 p.p.m. of sulfur in the feedstock to be oxidized will effectively inhibit the desired oxidation reaction. Preferably the feedstock after desulfurization contains less than 25 p.p.m. of sulfur, and is then suitable for conversion by air oxidation to the desired carbinol.

The mixture of dimethylphenyl methyl carbinol and dimethyl acetophenone which is obtained by partial oxidation of ethylxylene in the manner hereinbefore described can be readily hydrogenated to convert the acetophenone component to the desired carbinol. For example, the oxidation product obtained in Example 2 was treated with hydrogen in the presence of 4–5% by weight of copper chromite catalyst at 150° C. and 1000 p.s.i.g. hydrogen pressure. Under these conditions, the dimethyl acetophenone is converted to the desired carbinol in a 92% yield. The pure carbinol is obtained by fractional distillation of the hydrogenated product as a distillate having a boiling point of 94–97° C. at 4 mm. Hg and refractive index $n_D^{20}$ 1.5212.

The pure carbinol thus obtained is readily dehydrated to 3,5-dimethylstyrene, for example, by treatment with dehydrating agents such as potassium acid sulfate at elevated temperatures. Purification of the styrene product so obtained can be accomplished by subsequent fractional distillation under vacuum, preferably in the presence of polymerization inhibitors such as sulfur, p-t-butyl catechol or the like.

I claim:
1. A process for the preparation of 3,5-dimethylphenyl methyl carbinol which comprises the steps of
    (1) reacting xylene with an ethylating agent selected from the group consisting of ethylene and ethylbenzene in a solvent comprising liquid HF together with BF₃ to produce 1,3,5-ethylxylene having sulfur-containing impurity
    (2) recovering said 1,3,5-ethylxylene containing said sulfur-containing impurity by distillation
    (3) subjecting said 1,3,5-ethylxylene to a desulfurization step to effect substantially complete removal of sulfur-containing compounds therefrom
    (4) subjecting said sulfur-free 1,3,5-ethylxylene to liquid phase oxidation with a molecular oxygen-containing gas in the presence of a metallic oxidation catalyst
    (5) recovering 3,5-dimethylphenyl methyl carbinol as a reaction product.

2. The process of claim 1 wherein the sulfur content of the 1,3,5-ethylxylene is reduced to less than about 25 p.p.m. by contacting with a minor amount of Raney nickel at a temperature between about 50° C. and about 150° C. prior to oxidation thereof.

3. The process of claim 1 wherein the sulfur content of the 1,3,5-ethylxylene is reduced to less than about 25 p.p.m. by contacting with a minor amount of dispersed sodium metal at a temperature between about 100° C. and about 300° C. prior to oxidation thereof.

References Cited in the file of this patent

UNITED STATES PATENTS

| | | |
|---|---|---|
| 1,801,412 | Carlisle | Apr. 21, 1931 |
| 1,813,606 | Binapfl et al. | July 7, 1931 |
| 2,185,380 | McGee | Jan. 2, 1940 |
| 2,644,840 | Roebuck | July 7, 1953 |
| 2,661,382 | Lien et al. | Dec. 1, 1953 |
| 2,707,699 | Johnson et al. | May 3, 1955 |
| 2,766,307 | McCaulay et al. | Oct. 9, 1956 |
| 2,813,907 | Vlugter | Nov. 19, 1957 |